(12) United States Patent
Jornod

(10) Patent No.: US 7,070,165 B2
(45) Date of Patent: Jul. 4, 2006

(54) THERMAL ISOLATOR AND CONTROLLED VALVE EMPLOYING SAME

(75) Inventor: Eugene R. Jornod, Roscoe, IL (US)

(73) Assignee: Invensys Building Systems, Inc., Rockford, IL (US)

(*) Notice: Subject to any disclaimer, the term of this patent is extended or adjusted under 35 U.S.C. 154(b) by 260 days.

(21) Appl. No.: 10/427,635

(22) Filed: Apr. 30, 2003

(65) Prior Publication Data
US 2004/0217320 A1  Nov. 4, 2004

(51) Int. Cl.
*F16K 1/00* (2006.01)
(52) U.S. Cl. .................. 251/291; 251/356; 16/431
(58) Field of Classification Search .................. 251/11, 251/291, 292, 356; 137/334; 16/431
See application file for complete search history.

(56) References Cited

U.S. PATENT DOCUMENTS

| | | | |
|---|---|---|---|
| 3,024,403 A | 3/1962 | Safford | |
| 3,680,788 A * | 8/1972 | Cox | 239/265.23 |
| 5,098,063 A | 3/1992 | Ronzon | |
| 5,499,916 A * | 3/1996 | Schad et al. | 425/564 |
| 6,170,801 B1 | 1/2001 | Powell et al. | |
| 2003/0056835 A1 | 3/2003 | Gagnon | |

FOREIGN PATENT DOCUMENTS

EP        0 972 918 A2    1/2000

* cited by examiner

*Primary Examiner*—Justine R. Yu
*Assistant Examiner*—Peter deVore
(74) *Attorney, Agent, or Firm*—Leydig, Voit & Mayer, Ltd.

(57) ABSTRACT

A thermal isolator assembly that provides rigid construction, linearly and rotationally, is presented. The thermal isolator assembly includes a collar and a sleeve that are thermally isolated one from another but held in rigid mechanical relation. When constructed for actuated valves, the collar forms an actuator arm coupling member while the sleeve forms a valve stem coupling member. A pair of thermal isolators provide thermal isolation between these members. A polyphenylene sulfide compound, and preferably a fiberglass reinforced polyphenylene sulfide compound is used because of its high mechanical strength and low thermal conductivity for these thermal isolators.

18 Claims, 5 Drawing Sheets

THERMAL ISOLATOR AND CONTROLLED VALVE EMPLOYING SAME

FIELD OF THE INVENTION

The present invention relates generally to thermal isolation assemblies, and more particuarly to a thermal isolator for use with actuator controlled valves.

BACKGROUND OF THE INVENTION

Remote and automatic control mechanisms allow for increased productivity and enhanced safety in many industrial applications. For example, remote or automatic controlled valves may be used to control the flow of hot process fluids and high pressure steam in many industrial and commercial applications. These remote and automatic controllers eliminate the prior need for workers to open and close such flow control valves, thereby removing the possibility of human error, reducing the number of employees needed to operate complex fluid transfer systems, and reducing the possibility that a worker may become injured if a leak or malfunction may occur with the hot process fluid.

Early remote controlled valves still in use today in many applications utilize a solenoid driven linear actuator to open and close the valves to control the flow of fluid therethrough. The control for such solenoid valves is typically centrally located with power lines being run to each of the solenoids at each of the control valve locations. These valves typically only provide on/off control of the valves.

To provide variable flow control, the position of the valve stem has to be precisely controlled.

Such actuators utilize electrical control signals to cause an electric motor to operate, through either gears or a rack and pinion mechanism, to control the valve to open, close, or partially open positions. This allows the valve to control the flow of hot processed fluid, or steam, by way of remotely generated control signals of various magnitudes.

However, in installations that handle hot process fluid or steam, a considerable amount of heat from the process fluid or steam is conducted from the valve stem to the actuator assembly. Unfortunately, increased heat detrimentally affects the magnetics of the solenoid control mechanism as well as plastic gears and enclosures. As a result, precise control of the valve stem position is difficult. This results from the fact that additional energization current must be supplied to the solenoid as the temperature of the solenoid is increased by this thermal transfer. This precise control problem is exacerbated by the various installation locations and the impedance of the power lines from the central control to each individual solenoid controlled valve location. Likewise, as with the solenoid controlled valves, the increase in heat conducted from the valve stem to the actuator adversely affects the motor's ability to operate at a controlled level.

More modern remote and automatic controlled valves include the control electronics at the controlled valve location. Such design overcomes the problems associated with trying to precisely control valve stem position in a widely distributed fluid process control system from a centralized location. While the on-board electronics greatly enhance a valve's ability to precisely control the flow rate therethrough, electronics' inability to withstand high temperature environments has limited their applicability to process control systems for high temperature process fluids and steam. That is, when valves are used to control hot process fluids or steam, a considerable amount of heat is transferred through the valve stem to the actuator. This is because the moveable portion of the actuator mechanism must be rigidly connected to the valve stem to cause the valve to operate properly. Such heat transfer can be detrimental to sensitive components within the actuator, such as the control circuit electronics, the actuator motor, plastic gears, and the enclosure.

Therefore, there exists a need in the art for a thermal isolator that rigidly connects a valve actuator to the valve and that will allow proper operation of the actuator/valve combination while preventing unwanted heat from being transferred from the valve into the actuator mechanism.

BRIEF SUMMARY OF THE INVENTION

In view of the above, the present invention provides a new and improved thermal isolator that may be used, for example, to thermally isolate a valve actuator from the valve stem which it controls. More particularly, the present invention provides a new and improved thermal isolator that provides rigid connection between the valve actuator and the valve stem that is in contact with the hot process fluid or steam.

In a preferred embodiment, the thermal isolator of the present invention includes a valve stem coupling member that attaches to the valve stem, an actuator collar member that attaches to the actuator, and a thermal isolator positioned therebetween to minimize the thermal transfer from the valve stem coupling member to the actuator collar member. To maintain axial rigidity for linearly actuated valves, washers are utilized to allow an increased compression force to be used in the manufacture of the assembly.

In one embodiment, the valve stem sleeve is threaded to receive a threaded, linearly actuated valve stem. In alternate embodiments, the sleeve is configured to receive the valve stem of rotary actuated valves, such configuration may include geometric shapes, having flat sides to enable rotary actuation of the valve stem. Similarly, the actuator collar member is also configured to receive the actuator, either linear or rotary. In one embodiment the collar member includes pinning holes to allow for pinning to the actuator arm. In other embodiments, the collar may be threaded or surfaced.

In a preferred embodiment of the present invention, Likewise, as with the solenoid controlled valves, the increase in heat conducted from the valve stem to the actuator adversely affects the motor's ability to operate at a controlled level. a thermal isolator assembly for use between an actuator arm and a valve stem comprises a first coupling member having a bottom wall having a first aperture. The first coupling member also includes at least one side wall that is adapted to attach to the actuator arm. A second coupling member having a shank portion extends through the first aperture. The shank portion includes a bore that is adapted to receive the valve stem. A pair of thermal isolators are positioned on either side of the bottom wall. Each has an aperture that communicates with the aperture of the first coupling member to form a central passage. The shank portion of the second coupling member is positioned within the central passage and is rigidly affixed therein. The thermal isolators inhibit thermal transfer from the second coupling member to the first coupling member.

In a preferred embodiment, each of the thermal isolators include a flange of a height approximately equal to one half of a thickness of the bottom wall. The flange is positioned within the first aperture to inhibit thermal transfer from the second coupling member to an interior wall of the first aperture. In one embodiment the first aperture is circular and the flange is annular. In another embodiment, the first aperture is surfaced, and an outer wall of the flange is surfaced to match the surfaced first aperture. Preferably, the second coupling member includes a head portion at an external end of the shank portion having a diameter exceeding a diameter of the shank portion. In this embodiment, a first washer is positioned between the head portion and the thermal isolator. An interior end of the shank portion is rolled over, and a second washer is positioned between the rolled over interior end of the shank portion and the thermal isolator.

In a further embodiment, an interior surface of the bore is threaded, while in another the interior surface of the bore is surfaced. Preferably, the interior surface of the bore forms a squared "D". In another embodiment, the side wall includes at least one pinning hole. In one embodiment, the bottom wall is circular, and the side wall forms a cylindrical side wall. Preferably, the first coupling member is steel, the second coupling member is brass, and the thermal isolators are polyphenylene sulfide. The polyphenylene sulfide thermal isolators are preferably fiberglass reinforced; in one embodiment they are 40% fiberglass reinforced.

In an alternate embodiment of the present invention, a thermal isolator assembly comprises a first coupling member having a cylindrical side wall and a bottom wall including an aperture. A second coupling member has a shank portion positioned through the aperture. The shank portion defines a bore therein. A thermal isolator is positioned between the first coupling member and the second coupling member to inhibit thermal transfer from the second coupling member to the first coupling member. Preferably, the thermal isolator comprises a pair of thermal isolator bodies positioned on either side of the bottom wall of the first coupling member, each having an aperture. The shank portion of the second coupling member is positioned through the apertures. Still further, at least one of the thermal isolator bodies includes an annular flange positioned within the aperture of the bottom wall to inhibit thermal transfer between the second coupling member and a side wall of the aperture in the bottom wall. In one embodiment, the thermal isolator bodies are comprised of Ryton™ R-4. Preferably, the second coupling member includes a head portion having a diameter greater that the aperture in the thermal isolator. An interior end of the shank portion is rolled to form a rigid assembly.

In a further alternate embodiment of the present invention, a controlled valve comprises a valve body having an inlet, an outlet, and a valve mechanism actuated by a valve stem. An actuator assembly is positioned in proximity to the valve body, and includes an actuator arm. A thermal isolator assembly couples the actuator arm to the valve stem. The thermal isolator assembly comprises a first coupling member having a bottom wall having a first aperture. The first coupling member also includes at least one side wall that is adapted to attach to the actuator arm. A second coupling member having a shank portion extends through the first aperture. The shank portion includes a bore that is adapted to receive the valve stem. A pair of thermal isolators are positioned on either side of the bottom wall. Each has an aperture that communicates with the aperture of the first coupling member to form a central passage. The shank portion of the second coupling member is positioned within the central passage and is rigidly affixed therein. The thermal isolators inhibit thermal transfer from the second coupling member to the first coupling member.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principals of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
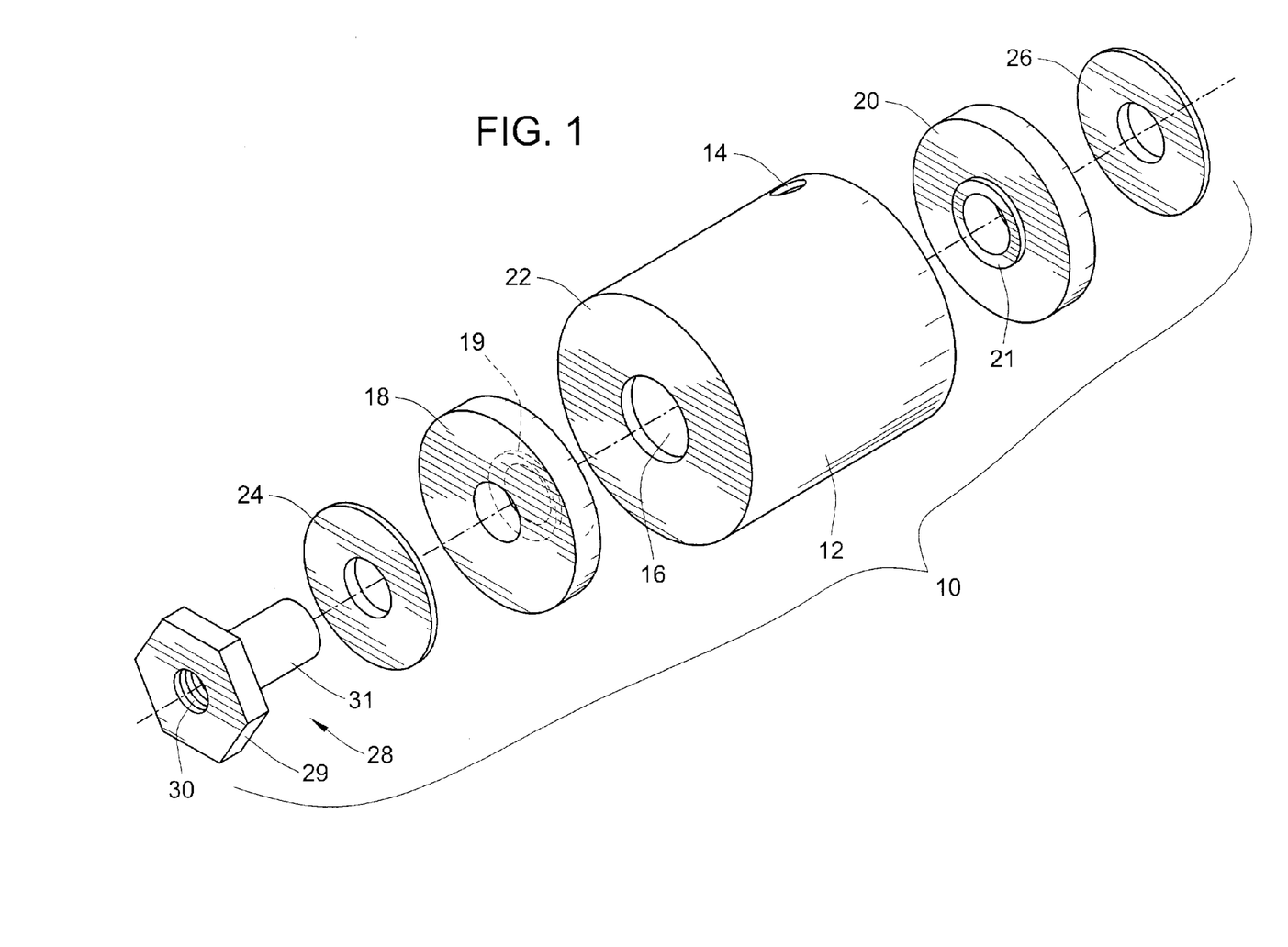
FIG. 1 is an exploded isometric view of an embodiment of the thermal isolator of the present invention.

Turning now to the drawings there is illustrated in exploded isometric form in FIG. 1 an embodiment of a valve stem thermal isolator 10 constructed in accordance with the teachings of the present invention. This thermal isolator includes an actuator arm coupling member 12 which is adapted to be affixed to the actuator arm of the valve actuator. In one embodiment, this actuator arm coupling member 12 may take the form of a collar that accommodates the driving end of the actuator arm therein. In such an embodiment, the collar 12 may include pinning holes 14 to accommodate pinning of the actuator arm therein. Other attachment mechanisms may also be employed depending on the application and actuator being used including, e.g. threaded attachments, surfaced attachments for rotary actuators, etc.

The actuator arm coupling member 12 also defines therein an aperture 16 that is sized to accommodate a flange of 19, 21 of thermal isolators 18, 20 therein. Preferably, each of the thermal isolators 18, 20 are of identical configuration so as to reduce the manufacturing cost of the valve stem thermal isolator assembly 10 of the present invention. Each of the thermal isolators 18, 20 are made from a material having a low conductivity, and preferably a high compression strength. For example, polyphenylene sulfide resins such as those sold under the trademark Ryton™ by Chevron Phillips Chemical Company, In a preferred embodiment, the particular polyphenylene sulfide resin used to construct the thermal isolators 18, 20 is Ryton™ R-4. This material is a 40% fiberglass reinforced polyphenylene sulfide compound having a thermal conductivity of 0.32 W/m·K. As a comparison, the thermal conductivity of steel is 46W/m·K while copper has a coefficient of thermal conductivity of 401 W/m·K.

In a preferred embodiment, the configuration of the thermal isolators 18, 20 are that of a disk having a small annular flange 19, 21 of a height approximately equal to one-half of the wall thickness of the actuator arm coupling member 12. In this way, the two thermal isolators 18, 20 may sandwich themselves on either side of the bottom wall 22 of the actuator arm coupling member 12. In this configuration, each thermal isolator 18, 20 provides thermal isolation to both the inside and the outside surfaces of the bottom wall 22, as well as to the inner wall of aperture 16.

A pair of washers 24, 26 are preferably used between the thermal isolators and the valve stem coupling member 28. These washers 24, 26 provide some additional thermal isolation, but primarily allow the assembly 10 to be constructed with increased compressive forces so that a very rigid assembly 10 results. In one embodiment, these washers 24, 26 are stainless steel. Such rigid assembly 10 is required for high precision linearly actuated valve applications that have a high degree of control flow characteristics. In such applications and in such an embodiment, the linear actuation of the actuator arm correlates directly to a like linear actuation of the valve stem through the valve stem thermal isolator assembly 10. However, it is noted that other applications may not require such excessive rigidity in a linear direction. In one embodiment of the present invention, the actuator arm coupling member 12 is steel, as are washers 24, 26. Preferably, the valve stem coupling member 28 is made of brass for cost savings, but may more preferably be made of stainless steel.

In the embodiment illustrated in FIG. 1, this valve stem coupling member 28 is threaded in its interior bore 30 through its shank portion 31 to attach to the valve stem. This configuration is particularly useful for linearly actuated valves. The head portion 29 preferably has a diameter greater than that of the aperture of the washer 24.

Figure 2:
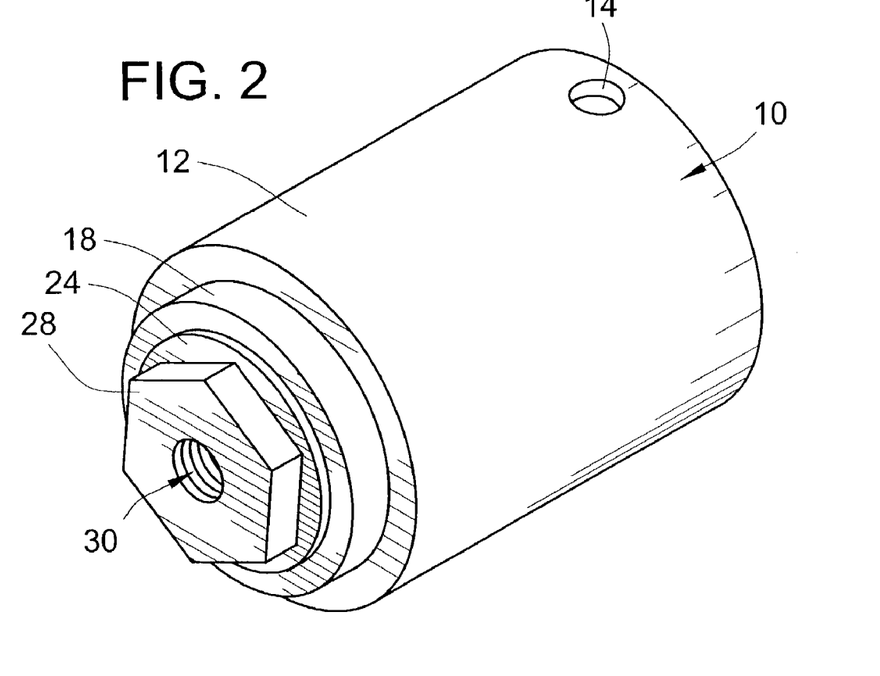
FIG. 2 is a perspective view illustration of the thermal isolator assembly of FIG. 1.

The completed assembly of the valve stem thermal isolator 10 of the present invention is illustrated in FIG. 2. In this embodiment, a threaded valve stem is received within the threaded bore 30 of the valve stem coupling member 28. To facilitate a secure connection, the head portion 29 of the valve stem coupling member 28 may include a surfaced exterior to accommodate the use of a wrench to tighten the threaded coupling against the jam nut on the valve stem. Once secure on the valve stem, the actuator arm may be installed into the actuator arm coupling member 12 and pinned in place via pinning holes 14.

Figure 3:
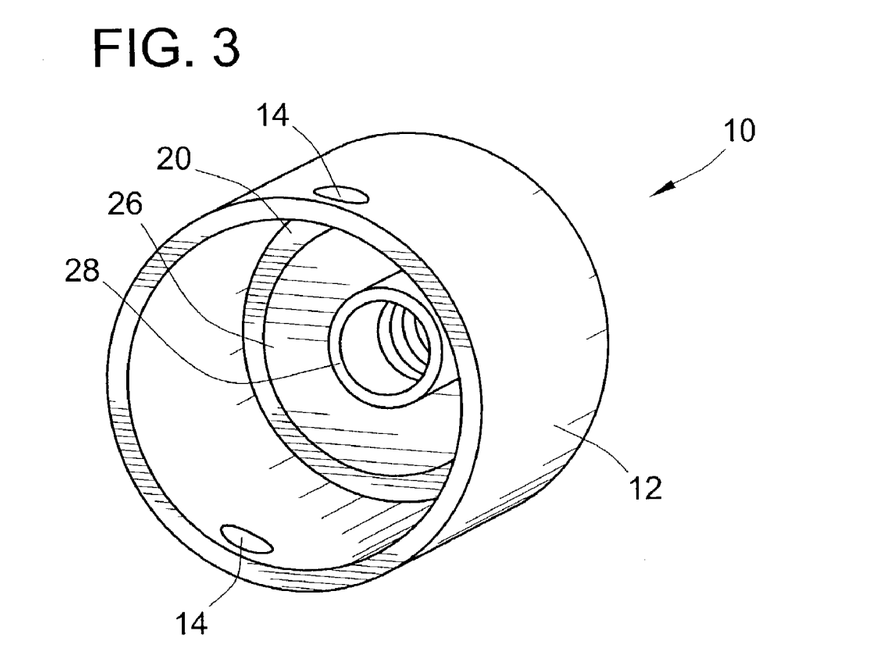
FIG. 3 is a top perspective view illustration of a partially assembled thermal isolator assembly of the present invention.

FIG. 3 illustrates an internal view of the valve stem thermal isolator assembly 10 of FIG. 2 prior to completing the manufacture of this assembly. As may be seen from this illustration, the shank portion 31 of the valve stem coupling member 28 extends into the interior of the actuator arm coupling member 12, through the thermal isolator 20 and the washer 26. This valve stem coupling member 28 may then be secured in place to complete the assembly 10. While various methods could be used to secure the valve stem coupling member 28 in place, e.g. threading a nut on the end of the valve stem coupling member, a preferred method is to roll the end of the valve stem coupling member 28 in an orbital spin riveter to ensure a rigid construction over the life of the valve stem thermal isolator assembly 10.

Figure 4:
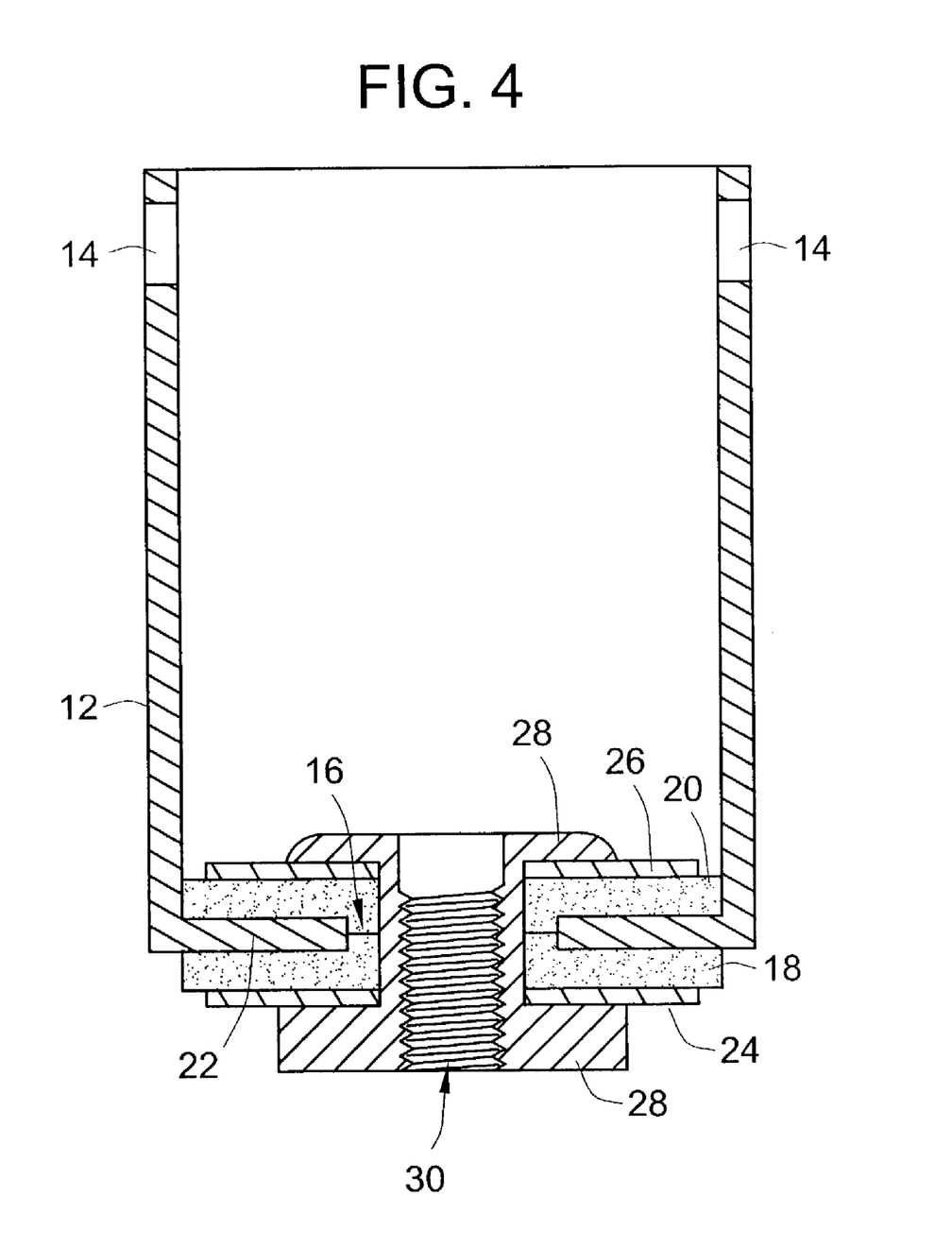
FIG. 4 is a cross-sectional view of the thermal isolator assembly of FIG. 2.

This preferred method of construction may be seen in the cross-sectional illustration of the valve stem thermal isolator assembly 10 of the present invention in FIG. 4. This cross-sectional illustration also makes clear the cooperating relationship between the two thermal isolators 18, 20 as they sandwich within the aperture 16 in the bottom wall 22 of the actuator arm coupling member 12. The relative thickness of the components of the assembly 10 may be adjusted depending on the application for which the assembly 10 is required and the amount of thermal isolation required.

Figure 5:
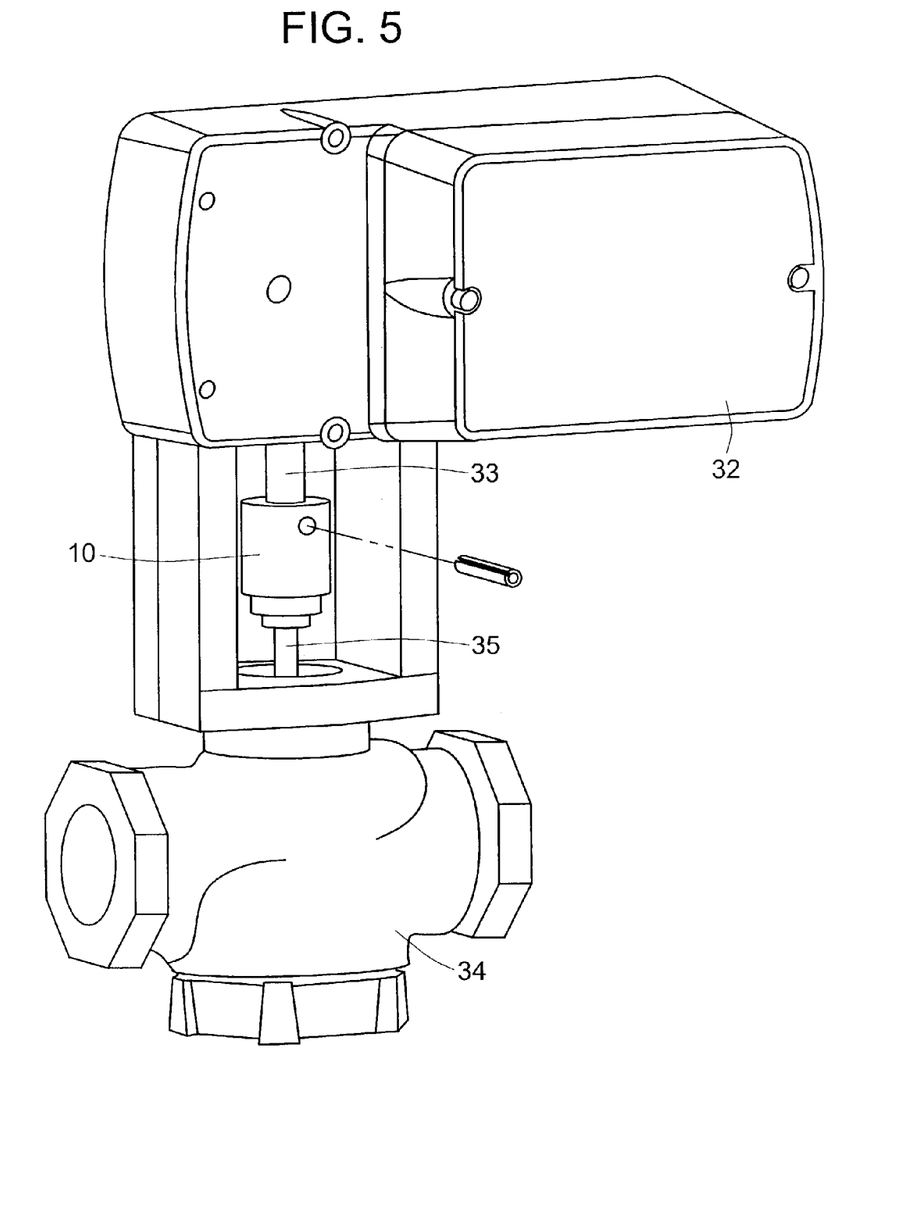
FIG. 5 is a perspective view illustration of a controlled valve utilizing the thermal isolator of the present invention.

FIG. 5 illustrates an exemplary implementation of the valve stem thermal isolator assembly 10 for a linearly actuated flow control valve. Specifically, the actuator assembly 32 is mounted on top of the flow control valve 34 in a conventional manner. The valve stem thermal isolator assembly 10 is positioned between the actuator 32 and the valve 34, providing a rigid coupling between the actuator arm 33 and the valve stem 35 while thermally isolating these two components to reduce the amount of heat that is conducted into the actuator 32 from the valve 34.

Figure 6:
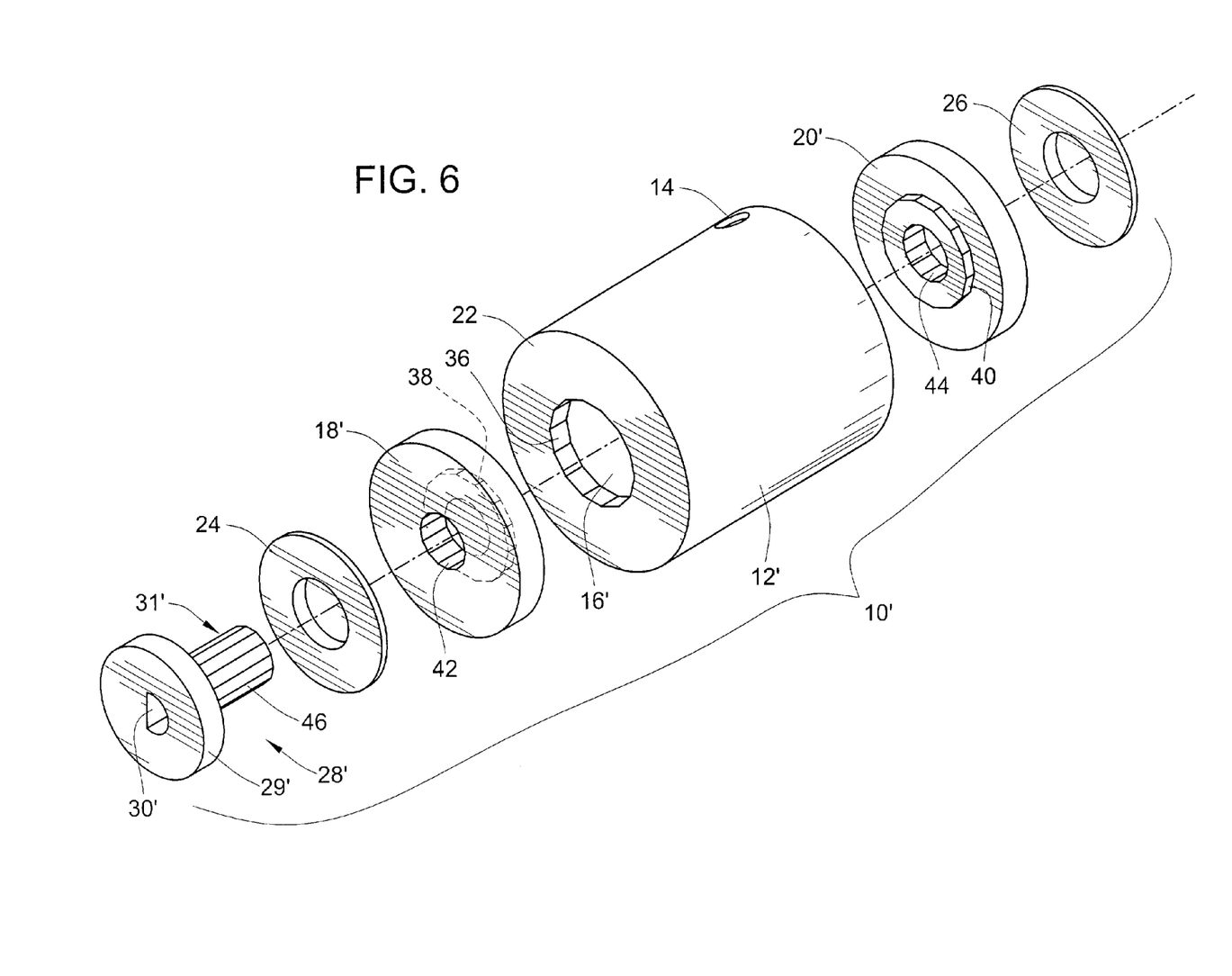
FIG. 6 is an exploded isometric view illustrating an alternate embodiment of a thermal isolator assembly constructed in accordance with the teachings of the present invention.

While the preceding embodiments have been particularly useful for application on a linearly actuated flow control valve, the embodiment of the valve stem thermal isolator assembly 10 illustrated in FIG. 6 finds particular applicability for rotary actuated valves. Specifically, in rotary actuated valves the linear rigidity of the assembly 10 is not as important as the rotational rigidity. That is, since rotary actuated valves (for example ball valves, butterfly valves, etc.) operate by rotating their valve stem, the linear position of the valve stem does not change. Instead, the angular rotation determines the amount by which the valve is allowed to open and close. As such, the aperture 16' in the bottom wall 22 of the actuator arm coupling member 12' is modified to have a surfaced wall 36. Each of the two thermal isolators 18', 20' also utilize a surfaced annular flange 38, 40. In this way, a rigid rotational coupling is maintained between the actuator arm coupling member 12' and the thermal isolators 18', 20'. Further, to ensure a rigid rotational coupling between the thermal isolators 18', 20' and the shank portion 31' of the valve stem coupling member 28' the interior aperture walls 42, 44 are also surfaced. In a like manner, the exterior walls 46 of the shank portion 31' of the valve stem coupling member 28' is also surfaced. The particular configuration of this surfacing may vary widely depending upon the rotational torque requirements of the particular application for which the valve stem thermal isolator assembly 10' of the present invention is to be applied. The bore 30' of the valve stem coupling member 28' is also surfaced to provide an appropriate rotational coupling to the valve stem. As illustrated in the embodiment of FIG. 6, this bore 30' is in a squared D configuration typical with rotary valve stems. However, this configuration may also vary widely depending upon the valve stem configuration.

As will be apparent to those skilled in the art, while the foregoing discussion confined itself to the application of the thermal isolator assembly 10 of the present invention to actuated valves, the invention itself is not so limited. Indeed, the thermal isolator assembly 10 of the present invention may find wide application where either linear or rotational couplings are desired, but heat transfer thereacross is not.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermal isolator assembly for use between an actuator arm and a valve stem, comprising:
    a first coupling member having a bottom wall defining a first aperture therein, the first coupling member having at least one side wall adapted to attach to the actuator arm;
    a second coupling member having a shank portion extending through the first aperture, the shank portion defining therein a bore adapted to receive the valve stem;
    a pair of thermal isolators positioned on either side of the bottom wall, each thermal isolator defining therein a second aperture communicating with the first aperture to form a central passage therethrough; and
    wherein the shank portion of the second coupling member is positioned within the central passage and is rigidly affixed therein; and
    wherein the thermal isolators inhibit thermal transfer from the second coupling member to the first coupling member.

2. The thermal isolator assembly of claim 1, wherein each of the thermal isolators include a flange of a height approximately equal to one half of a thickness of the bottom wall, and wherein the flange is positioned within the first aperture to inhibit thermal transfer from the second coupling member to an interior wall of the first aperture.

3. The thermal isolator assembly of claim 2, wherein the first aperture is circular, and wherein the flange is annular.

4. The thermal isolator assembly of claim 2, wherein the first aperture is surfaced, and wherein an outer wall of the flange is surfaced to match the surfaced first aperture.

5. The thermal isolator assembly of claim 1, wherein the second coupling member includes a head portion at an external end of the shank portion, the head portion having a diameter exceeding a diameter of the shank portion, further comprising a first washer positioned between the head portion and the thermal isolator.

6. The thermal isolator assembly of claim 5, wherein an interior end of the shank portion is rolled over, further comprising a second washer positioned between the rolled over interior end of the shank portion and the thermal isolator.

7. The thermal isolator assembly of claim 1, wherein an interior surface of the bore is threaded.

8. The thermal isolator assembly of claim 1, wherein an interior surface of the bore is surfaced.

9. The thermal isolator assembly of claim 8, wherein an interior surface of the bore forms a squared D.

10. The thermal isolator assembly of claim 1, wherein the at least one side wall defines therein at least one pinning hole.

11. The thermal isolator assembly of claim 1, wherein the bottom wall is circular, and wherein the at least one side wall forms a cylindrical side wall.

12. The thermal isolator assembly of claim 1, wherein the first coupling member is steel, wherein the second coupling member is brass, and wherein the thermal isolators are polyphenylene sulfide.

13. The thermal isolator assembly of claim 12, wherein the polyphenylene sulfide thermal isolators are fiberglass reinforced.

14. The thermal isolator assembly of claim 13, wherein the fiberglass reinforced polyphenylene sulfide thermal isolators are 40% fiberglass reinforced.

15. A thermal isolator assembly, comprising:
    a first coupling member having a cylindrical side wall and a bottom wall, the bottom wall defining an aperture therethrough;
    a second coupling member having a shank portion positioned through the aperture, the shank portion defining a bore therein; and
    a thermal isolator positioned between the first coupling member and the second coupling member to inhibit thermal transfer from the second coupling member to the first coupling member, wherein the thermal isolator comprises a pair of thermal isolator bodies positioned on either side of the bottom wall of the first coupling member, each of the thermal isolator bodies defining an aperture therethrough, and wherein the shank portion of the second coupling member is positioned therethrough.

16. The thermal isolator assembly of claim 15, wherein at least one of the thermal isolator bodies includes an annular flange positioned within the aperture of the bottom wall to inhibit thermal transfer between the second coupling member and a side wall of the aperture in the bottom wall.

17. The thermal isolator assembly of claim 15, wherein the thermal isolator bodies are comprised of Ryton™ R-4.

18. A controlled valve, comprising:
    a valve body having an inlet, an outlet, and a valve mechanism therebetween, the valve mechanism being actuated by a valve stem;
    an actuator assembly positioned in proximity to the valve body, the actuator assembly including an actuator arm;
    a thermal isolator assembly coupling the actuator arm to the valve stem, the thermal isolator assembly including
    a first coupling member having a bottom wall defining a first aperture therein, the first coupling member having at least one side wall adapted to attach to the actuator arm,
    a second coupling member having a shank portion extending through the first aperture, the shank portion defining therein a bore adapted to receive the valve stem,
    a pair of thermal isolators positioned on either side of the bottom wall, each thermal isolator defining therein a second aperture communicating with the first aperture to form a central passage therethrough, and wherein the shank portion of the second coupling member is positioned within the central passage and is rigidly affixed therein, and wherein the thermal isolators provide thermal inhibit thermal transfer from the second coupling member to the first coupling member.

* * * * *